(12) United States Patent
Lee et al.

(10) Patent No.: US 11,287,553 B2
(45) Date of Patent: Mar. 29, 2022

(54) LIQUID LENS

(71) Applicant: LG INNOTEK CO., LTD., Seoul (KR)

(72) Inventors: Kyu Tae Lee, Seoul (KR); Seong Su Eom, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 323 days.

(21) Appl. No.: 16/475,581

(22) PCT Filed: Jan. 8, 2018

(86) PCT No.: PCT/KR2018/000373
§ 371 (c)(1),
(2) Date: Jul. 2, 2019

(87) PCT Pub. No.: WO2018/128508
PCT Pub. Date: Jul. 12, 2018

(65) Prior Publication Data
US 2019/0346593 A1 Nov. 14, 2019

(30) Foreign Application Priority Data

Jan. 9, 2017 (KR) .......... 10-2017-0002726
Jan. 9, 2017 (KR) .......... 10-2017-0002865

(51) Int. Cl.
*G02B 3/12* (2006.01)
*G02B 1/06* (2006.01)
(Continued)

(52) U.S. Cl.
CPC .......... *G02B 3/14* (2013.01); *G02B 13/0075* (2013.01); *G02B 26/004* (2013.01); *G03B 5/02* (2013.01); *G03B 5/04* (2013.01)

(58) Field of Classification Search
CPC .... G02B 3/14; G02B 13/0075; G02B 26/004; G03B 5/02; G03B 5/04
(Continued)

(56) References Cited

U.S. PATENT DOCUMENTS

| 8,570,659 B2 | 10/2013 | Kong et al. |
| 9,201,174 B2 | 12/2015 | Karam et al. |
| 2012/0026596 A1 | 2/2012 | Berge et al. |

FOREIGN PATENT DOCUMENTS

| CN | 101002115 | 7/2007 |
| CN | 102472837 | 5/2012 |

(Continued)

OTHER PUBLICATIONS

Chinese Office Action dated Jul. 13, 2020 issued in Application No. 201880006390.X.
(Continued)

*Primary Examiner* — William Choi
(74) *Attorney, Agent, or Firm* — Ked & Associates LLP

(57) ABSTRACT

A liquid lens according to an embodiment includes a first plate comprising a cavity in which a conductive liquid and a non-conductive liquid are disposed, the cavity having an inclined surface; a first electrode disposed on the inclined surface; a second electrode disposed on the first plate; and a black insulation layer disposed between the first electrode and the conductive liquid, wherein the conductive liquid and the non-conductive liquid form an interface therebetween, and the interface moves along one surface of the black insulation layer.

19 Claims, 10 Drawing Sheets

(51) Int. Cl.
  *G02B 3/14*   (2006.01)
  *G02B 13/00*  (2006.01)
  *G02B 26/00*  (2006.01)
  *G03B 5/02*   (2021.01)
  *G03B 5/04*   (2021.01)

(58) Field of Classification Search
  USPC .................................................. 359/665, 666
  See application file for complete search history.

(56) References Cited

FOREIGN PATENT DOCUMENTS

| JP | 2007-333975 | 12/2007 |
| JP | 2008-175918 | 7/2008 |
| JP | 2012-042744 | 3/2012 |

OTHER PUBLICATIONS

International Search Report (with English Translation) and Written Opinion dated Mar. 27, 2018 issued in Application No. PCT/KR2018/000373.

| INCIDENCE ANGLE | 15° | 25° | 35° | 45° |
|---|---|---|---|---|
| BEAM PATH | | | | |
| ABNORMAL QUANTITY OF LIGHT | 0.014 % | 0.056 % | 0.053 % | 1.690 % |

LIQUID LENS

CROSS-REFERENCE TO RELATED PATENT APPLICATIONS

This application is a U.S. National Stage Application under 35 U.S.C. § 371 of PCT Application No. PCT/KR2018/000373, filed Jan. 8, 2018, which claims priority to Korean Patent Application Nos. 10-2017-0002726 and 10-2017-0002865, both filed Jan. 9, 2017, whose entire disclosures are hereby incorporated by reference.

TECHNICAL FIELD

Embodiments relate to a lens having a variable focal length (or a variable focal distance), and more particularly to a liquid lens capable of adjusting a focal length using electrical energy, a camera module, and an optical device.

BACKGROUND ART

People who use portable devices demand optical devices that have high resolution, are small, and have various photographing functions (an optical zoom-in/zoom-out function, an auto-focusing (AF) function, a handshake compensation or optical image stabilization (OIS) function, etc.). Such photographing functions may be realized by directly moving a plurality of lenses that are combined. In the case in which the number of lenses is increased, however, the size of an optical device may be increased. The auto-focusing and handshake compensation functions are performed by tilting or moving a lens module including a plurality of lenses, which is fixed to a lens holder in the state in which the optical axes of the lens are aligned, along the optical axis or in the direction perpendicular to the optical axis. An additional lens moving apparatus is used to move the lens module. However, the lens moving apparatus has high power consumption, and an additional cover glass needs to be provided separately from the camera module in order to protect the lens moving apparatus, thus leading to an increase in the overall thickness of an optical device.

Therefore, research has been conducted on a liquid lens configured to electrically adjust the curvature of an interface between two kinds of liquid in order to perform auto-focusing and handshake compensation functions.

DISCLOSURE

Technical Problem

A first embodiment provides a liquid lens capable of reducing the number of components, such as a glass, which are difficult to manufacture, a camera module, and an optical device.

A second embodiment provides a liquid lens capable of preventing a ghost or flare phenomenon, which deteriorates the characteristics of the lens, a camera module, and an optical device.

However, the objects to be accomplished by the disclosure are not limited to the above-mentioned objects, and other objects not mentioned will be clearly understood by those skilled in the art from the following description.

Technical Solution

In one embodiment, a liquid lens may include a first plate including a cavity formed therein to accommodate a conductive liquid and a non-conductive liquid, a first electrode disposed on the first plate, an insulation layer disposed on the first electrode, a second electrode disposed on the insulation layer, a second plate disposed on the second electrode and coupled to the first plate, and a first substrate disposed between the first plate and the second plate and electrically connected to the first electrode and the second electrode. The first electrode may be connected to a lower side of the first substrate, and the second electrode may be connected to an upper side of the first substrate.

Depending on the embodiment, the side wall of the cavity may include a predetermined inclined surface.

Depending on the embodiment, the first electrode may include a plurality of electrode sectors disposed on the inclined surface, and the second electrode may include one or more electrode sectors, at least a portion of which is in contact with the non-conductive liquid.

Depending on the embodiment, the thickness of the first substrate may be less than the thickness of the insulation layer.

Depending on the embodiment, the thickness of the first substrate may range from 25 to 200 µm.

Depending on the embodiment, the insulation layer may be disposed so as not to overlap the first substrate.

Depending on the embodiment, the first electrode and the second electrode may not be disposed in an optical path that light penetrates through the liquid lens.

Depending on the embodiment, the first electrode may be disposed on the upper side of the first plate through metal deposition.

The second electrode may be disposed on the lower side of the second plate through metal deposition.

Depending on the embodiment, the first electrode and the second electrode may be adhered to the first substrate through a bonding process.

In another embodiment, a liquid lens may include a first plate including an open region having a predetermined inclined surface, a second plate disposed on the first plate, a conductive liquid and a non-conductive liquid charged in a cavity defined by the first plate, the second plate, and the open region, and a first electrode and a second electrode disposed between the first plate and the second plate.

In still another embodiment, a camera module may include a housing including an open upper side and an open lower side, a liquid lens accommodated in the housing, a first lens unit disposed on the liquid lens, a second lens unit disposed under the liquid lens, a sensor substrate disposed under the second lens unit and including an image sensor mounted thereon, and a first substrate electrically connecting the liquid lens to the sensor substrate. The first substrate may be disposed between a first plate and a second plate of the liquid lens, and may be electrically connected to a first electrode and a second electrode of the liquid lens.

In still another embodiment, a liquid lens may include a first plate including an inclined surface therein, a conductive liquid and a non-conductive liquid disposed on the inclined surface, a first electrode disposed on the inclined surface, a second electrode disposed on the first plate, and a black insulation layer disposed on the first electrode. An interface formed between the conductive liquid and the non-conductive liquid may move along the black insulation layer disposed on the inclined surface.

Depending on the embodiment, the black insulation layer may be disposed so as not to overlap an open surface, which is formed under the non-conductive liquid.

Depending on the embodiment, the black insulation layer may be disposed so as to be in contact with the first electrode or the second electrode transmitting an electrical signal for controlling the interface.

Depending on the embodiment, the liquid lens may further include a transparent insulation layer disposed between the third plate and the non-conductive liquid.

Depending on the embodiment, the transparent insulation layer and the black insulation layer may have the same thickness as each other.

Depending on the embodiment, the black insulation layer may be disposed so as to extend along the lower side or the upper side of the first plate.

Depending on the embodiment, the black insulation layer may include a material coated with graphite, a soma film, or a black resin.

In still another embodiment, a liquid lens may include a first plate including an open region having a predetermined inclined surface, a conductive liquid and a non-conductive liquid disposed on the inclined surface, a first electrode disposed on the inclined surface, a second electrode disposed on the first plate, a third plate disposed under the first electrode, a second plate disposed on the second electrode, an insulation layer disposed on the first electrode, and a reflection-preventing layer disposed on the insulation layer. The reflection-preventing layer may be disposed on a position, at which an interface is formed between the conductive liquid and the non-conductive liquid along the inclined surface, thereby preventing reflection due to the inclined surface.

In still another embodiment, a camera module may include the liquid lens, an image sensor converting light transmitted through the liquid lens into an electrical signal, and a control circuit generating an electrical signal, which is transmitted via the first electrode and the second electrode to control the interface.

The above aspects of the present disclosure are only a part of the exemplary embodiments of the present disclosure, and various embodiments based on technical features of the present disclosure may be devised and understood by those skilled in the art from the following detailed description of the present disclosure.

Advantageous Effects

The effects of the device according to the present disclosure will be described below.

According to a liquid lens, a camera module, and an optical device according to a first embodiment, it is possible to reduce the amount of glass, which is difficult to process, and the number of flexible printed circuit boards (FPCBs) without deteriorating the performance of the liquid lens, thereby reducing manufacturing costs and eliminating unnecessary processes.

According to a liquid lens, a camera module, and an optical device according to a second embodiment, it is possible to prevent a ghost phenomenon or a flare phenomenon due to reflection of light at an interface between liquids having respectively different properties and an inclined surface in an open region without affecting a field-of-view (FOV) of the liquid lens.

However, the effects achievable through the disclosure are not limited to the above-mentioned effects, and other effects not mentioned will be clearly understood by those skilled in the art from the following description.

BEST MODE

Figure 1:
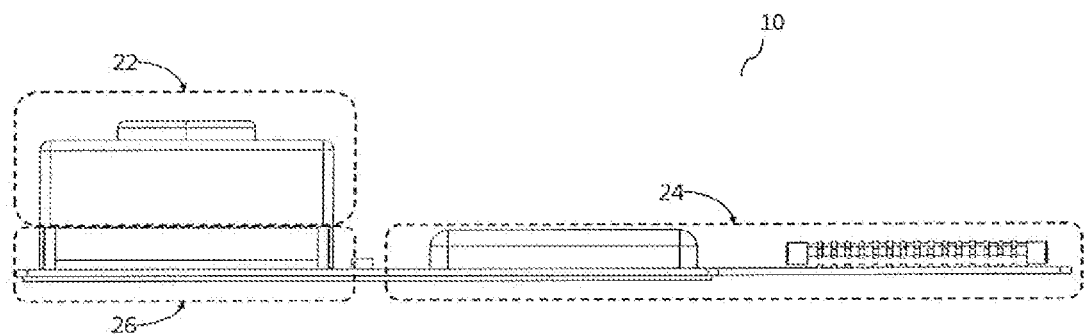
FIG. 1 is a schematic cross-sectional view of a camera module according to first and second embodiments.

Reference will now be made in detail to the preferred embodiments, examples of which are illustrated in the accompanying drawings. While the disclosure is susceptible to various modifications and alternative forms, specific embodiments thereof are shown by way of example in the drawings. However, the disclosure should not be construed as being limited to the embodiments set forth herein, but on the contrary, the disclosure is to cover all modifications, equivalents, and alternatives falling within the spirit and scope of the embodiments.

It may be understood that, although the terms "first", "second", etc. may be used herein to describe various elements, these elements are not to be limited by these terms. These terms are generally only used to distinguish one element from another. In addition, terms particularly defined in consideration of the construction and operation of the embodiments are used only to describe the embodiments, but do not define the scope of the embodiments.

In the following description of the embodiments, it will be understood that, when each element is referred to as being "on" or "under" another element, it can be "directly" on or under another element or can be "indirectly" formed such that an intervening element is also present. In addition, when an element is referred to as being "on" or "under", "under the element" as well as "on the element" may be included based on the element.

In addition, relational terms, such as "on/upper part/above" and "under/lower part/below", are used only to distinguish between one subject or element and another subject or element without necessarily requiring or involving any physical or logical relationship or sequence between such subjects or elements.

In the following description, elements denoted by the same reference numerals may be construed as having the same structures, functions and materials.

First Embodiment

FIG. 1 illustrates an example of a camera module 10 according to an embodiment.

Referring to FIG. 1, the camera module 10 may include a lens assembly 22, which includes a liquid lens and a plurality of lenses, a control circuit 24, and an image sensor 26.

The liquid lens is adjusted in focal length corresponding to a driving voltage applied between a common electrode including at least one electrode sector and an individual electrode including a plurality of electrode sectors, and the control circuit 24 transmits a signal for supplying or transmitting the driving voltage to the liquid lens. The image sensor 26 may be aligned with the lens assembly 22, and may convert the light transmitted through the lens assembly 22 into an electrical signal.

The camera module 10 may include a plurality of circuits 24 and 26, disposed on a single printed circuit board (PCB), and a lens assembly 22, including a plurality of lenses. However, this is merely illustrative, and the scope of the disclosure is not limited thereto. The configuration of the control circuit 24 may be designed differently in accordance with the specifications required for an optical device.

In particular, in order to reduce the intensity of the operating voltage applied to the lens assembly 22, the control circuit 24 may be implemented as a single chip. As a result, it is possible to further reduce the size of the optical device that is mounted in a portable device.

Figure 2:
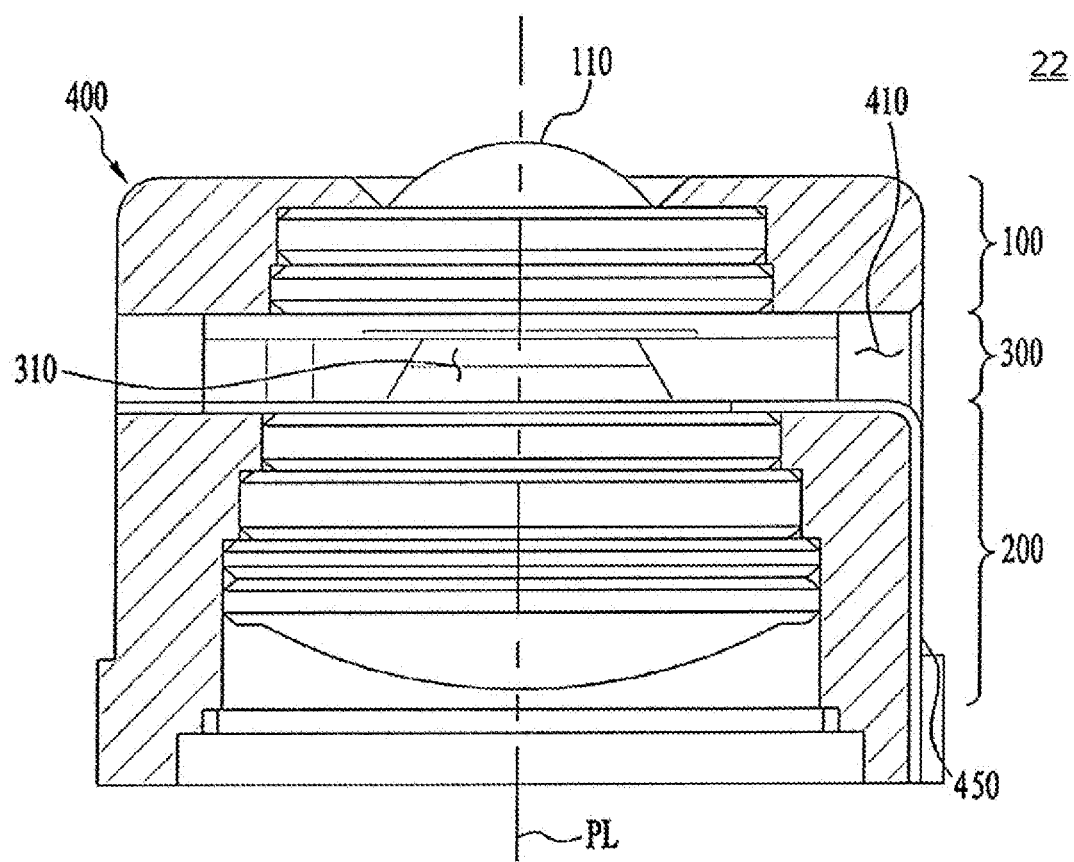
FIG. 2 shows an example of a lens assembly included in the camera module according to the first and second embodiments.

FIG. 2 illustrates an example of the lens assembly 22 included in the camera module 10.

Referring to FIG. 2, the lens assembly 22 may include a first lens unit 100, a second lens unit 200, a liquid lens (or a liquid lens unit) 300, a holder 400, and a connection unit 450. The illustrated structure of the lens assembly 22 is just one example, and the structure of the lens assembly 22 may be changed depending on the specifications required for an optical device. For example, in the illustrated example, the liquid lens 300 is disposed between the first lens unit 100 and the second lens unit 200. However, in another example, the liquid lens 300 may be disposed on the first lens unit 100 (or on the front surface of the first lens unit), the liquid lens 300 may be disposed under the third lens unit 200 (or on the rear surface of the third lens unit), or the second lens unit 200 may be omitted.

The liquid lens 300 shown in FIG. 2 is disposed such that a portion thereof in which a cavity is formed to be wide is oriented toward the image sensor and such that a portion thereof in which the cavity is formed to be narrow is oriented toward the upper side (the front surface). However, in the case in which the liquid lens 300 is disposed on the first lens unit 100 (or on the front surface of the first lens unit), the liquid lens 300 may be disposed so as to be inverted from the orientation shown in FIG. 2.

The first lens unit 100 is disposed at the front side of the lens assembly 22, and receives light from the outside of the lens assembly 22. The first lens unit 100 may include at least one lens, or two or more lenses may be aligned along a center axis PL to form an optical system.

The first lens unit 100 and the second lens unit 200 may be mounted in the holder 400. Here, a through-hole may be formed in the holder 400, and the first lens unit 100 and the second lens unit 200 may be disposed in the through-hole. Further, the liquid lens 300 may be inserted into the space between the first lens unit 100 and the second lens unit 200 in the holder 400.

Meanwhile, the first lens unit 100 may include an exposure lens 110. Further, the exposure lens 110 may protrude to the outside of the holder 400. In the case of the exposure lens 110, the lens surface thereof may be damaged due to exposure to the outside. If the lens surface is damaged, the quality of an image photographed by the camera module 10 may be deteriorated. In order to prevent or suppress damage to the surface of the exposure lens 110, a method of disposing a cover glass, a method of forming a coating layer, or a method of forming the exposure lens 110 using a wear-resistant material for preventing damage to the surface of the exposure lens 110 may be applied.

The second lens unit 200 may be disposed at the rear of the first lens unit 100 and the liquid lens 300, and the light incident on the first lens unit 100 from the outside may pass through the liquid lens 300 and may be incident on the second lens unit 200. The second lens unit 200 may be spaced apart from the first lens unit 100, and may be disposed in the through-hole formed in the holder 400.

Meanwhile, the second lens unit 200 may include at least one lens, and when two or more lenses are included, the lenses may be aligned along the center axis PL to form an optical system.

The liquid lens 300 may be disposed between the first lens unit 100 and the second lens unit 200, and may be inserted into an insertion hole 410 formed in the holder 400. The liquid lens 300 may also be aligned along the center axis PL in the same manner as the first lens unit 100 and the second lens unit 200.

The liquid lens 300 may include a lens region 310. The lens region 310 may be a region that light that has passed through the first lens unit 100 penetrates, and may include a liquid in at least a portion thereof. For example, two kinds of liquid, i.e. a conductive liquid and a non-conductive liquid, may be included in the lens region 310, and the conductive liquid and the non-conductive liquid may form an interface therebetween without mixing with each other. The interface between the conductive liquid and the non-conductive liquid may be deformed by a driving voltage applied thereto through the connection unit 450, whereby the curvature of the interface of the liquid lens 300 and/or the focal length of the liquid lens may be changed. When the deformation of the interface and the change in the curvature thereof are controlled, the liquid lens 300, the lens assembly 22 including the same, and the camera module 10 may perform an optical zoom-in/zoom-out function, an auto-focusing (AF) function, a handshake compensation or optical image stabilization (OIS) function, etc.

The connection unit 450 may include at least one of a metal plate, a first substrate, or a wire in order to electrically connect the liquid lens 300 and the control circuit 24 to each other.

Figure 3:
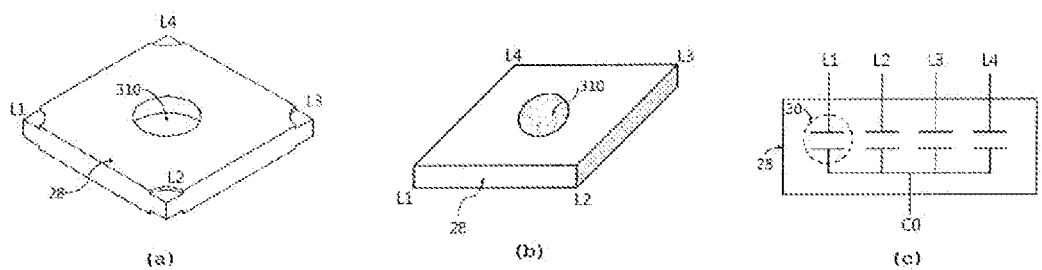
FIG. 3 shows a lens, an interface of which is adjusted in accordance with a driving voltage in the camera module according to the first and second embodiments.

FIG. 3 is a view showing a liquid lens, the interface of which is adjusted corresponding to a driving voltage. Specifically, FIGS. 3(a) and 3(b) illustrate perspective views of examples of a liquid lens 28 included in the lens assembly 22 (refer to FIG. 2), and FIG. 3(c) illustrates a schematic equivalent circuit of the liquid lens 28.

First, referring to FIGS. 3(a) and 3(b), the liquid lens 28, the interface of which is adjusted corresponding to a driving voltage, may receive driving voltages via individual electrodes L1, L2, L3 and L4, which are disposed at the same angular intervals from each other in four different directions. When the driving voltages are applied to the liquid lens via the individual electrodes L1, L2, L3 and L4, the interface between the conductive liquid and the non-conductive liquid disposed in the lens region 310 may be deformed. The degree and type of deformation of the interface between the conductive liquid and the non-conductive liquid may be controlled by the control circuit 24 in order to realize an AF function or an OIS function.

Further, referring to FIG. 3(c), the lens 28 may be defined as a plurality of capacitors 30, one side of each of which receives a driving voltage from a corresponding one of the individual electrodes L1, L2, L3 and L4, and the other side of which is connected to a common electrode C0.

Although an embodiment in which four electrode sectors are provided as the individual electrodes is described by way of example, the scope of the embodiment is not limited thereto.

Figure 4:
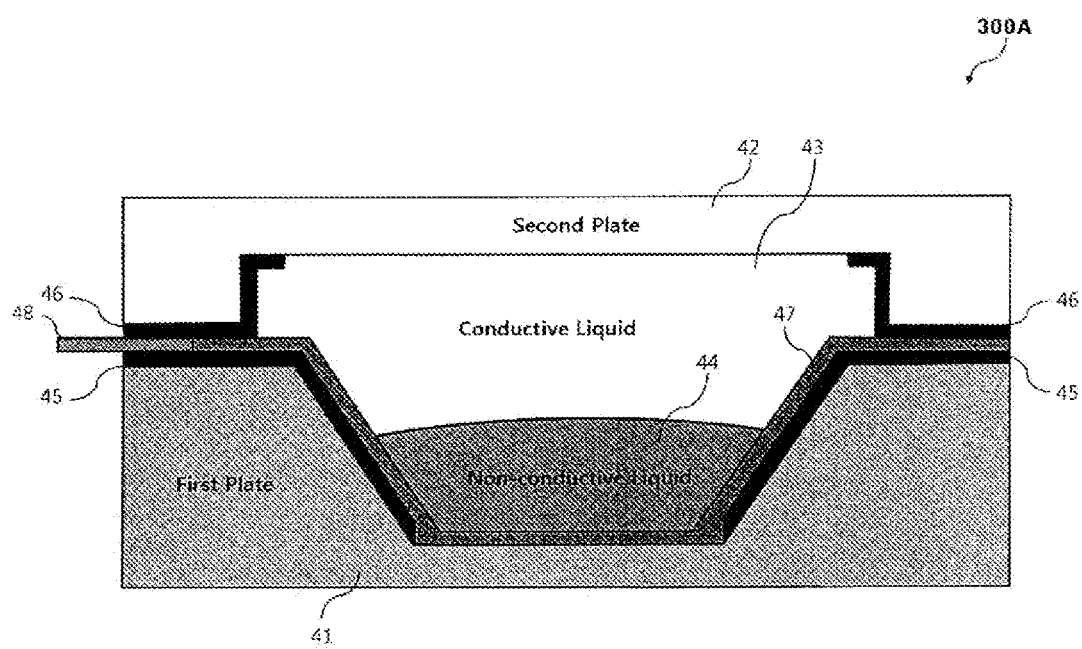
FIG. 4 is a view showing a liquid lens according to a first embodiment.

FIG. 4 is a cross-sectional view of a liquid lens 300A according to one embodiment.

Referring to FIG. 4, the cross-section of the liquid lens 300A corresponds to the cross-section of an example of the liquid lens 300 shown in FIG. 2 or 3.

The liquid lens 300A may include at least one of a first plate 41, a second plate 42, a conductive liquid 43, a non-conductive liquid 44, a first electrode 45, a second electrode 46, or an insulation layer 47, and may further include a first substrate 48.

The first plate 41 may be formed of a transparent material, and may be the first part of the liquid lens 300A that receives the light that has passed through the first lens unit 100 (refer to FIG. 2). Although the present disclosure is described on the assumption that the liquid lens 300A is the liquid lens 300 or 28 included in the lens assembly 22 shown in FIG. 2 (the upper side in FIG. 4 corresponds to the lower side in FIG. 2 and the lower side in FIG. 4 corresponds to the upper side in FIG. 2), the liquid lens 300A may be mounted in the lens assembly 22 such that the first plate 41 is the last part of the liquid lens 300A that receives light.

The first plate 41 may include an open region having a predetermined inclined surface (e.g. an inclined surface having an angle of about 50° to 70° or about 55° to 65°), and the open region may have a truncated cone shape in which the area of the upper open surface thereof is greater than the area of the lower open surface thereof.

The second plate 42 may be formed of a transparent material, and may receive the light that has passed through the first plate 41, the non-conductive liquid 44, and the conductive liquid 43.

The first plate 41 and the second plate 42 are housing structures that provide a cavity in the liquid lens 300A, which is a space in which two liquids having respectively different properties may be charged, accommodated, or disposed. The first plate 41 and the second plate 42 may include a region through which an optical signal passes, and thus may be formed of a material having high transparency, such as glass. In the case in which the cavity is formed through bonding using the same material for convenience of processing, it is easy to prevent the liquid charged in the cavity from flowing out. Thus, the first plate 41 and the second plate 42 may include the same material as each other.

The conductive liquid 43 and the non-conductive liquid 44 may be charged or disposed in a cavity defined by the open region. That is, the conductive liquid 43 and the non-conductive liquid 44 may be charged or disposed in the cavity, and an interface may be formed between the conductive liquid 43 and the non-conductive liquid 44.

As the interface formed between the conductive liquid 43 and the non-conductive liquid 44 changes in curvature, flexure, inclination, and shape, the focal length or the shape of the liquid lens 300A may be adjusted. The region in which an optical signal passes through the interface may correspond to the lens region 310 described with reference to FIG. 3.

The conductive liquid 43 may include at least one of ethylene glycol or sodium bromide (NaBr), or may be formed of a mixture of ethylene glycol and sodium bromide (NaBr). The non-conductive liquid 44 may include a phenyl-based silicon oil.

The first electrode 45 and the second electrode 46 may function to apply an electrical signal received from the control circuit 24 (refer to FIG. 1) for controlling the interface formed between the conductive liquid 43 and the non-conductive liquid 44.

As described with reference to FIG. 3, electrodes and/or electrode patterns for forming the individual electrodes L1, L2, L3 and L4 and the common electrode C0 may be included in the upper side of the first plate 41 and the lower side of the second plate 42, and the first electrode 45 and the second electrode 46 may respectively correspond thereto. Although the first electrode 45 and the second electrode 46 are illustrated in FIG. 4 in a simplified manner, the second electrode 46 may be implemented to have a pattern through which a terminal for supplying a common voltage (e.g. a ground voltage) to the common electrode C0 of the first substrate 48 is electrically connected to the common electrode C0 disposed so as to surround the inclined surface in the open region. Further, the common electrode C0 may be exposed so as to be in contact with the conductive liquid 43.

The first electrode 45 may be implemented to have a pattern through which terminals for supplying driving voltages to the respective individual electrodes L1, L2, L3 and L4 of the first substrate 48 are electrically connected to the individual electrodes L1, L2, L3 and L4, which are disposed at the same angular intervals from each other in four different directions.

Unlike the second electrode 46, the first electrode 45 may be electrically separated from the conductive liquid 43 and the non-conductive liquid 44 using an insulation layer 48 in order to prevent electrolysis of the conductive liquid 43, which is conductive.

The first electrode 45 and the second electrode 46 may include chrome (Cr). Chromium or chrome is a glossy silver rigid transition metal, which is not fragile, does not readily discolor, and has a high melting point. However, since an alloy including chromium exhibits high corrosion resistance and rigidity, chromium may be used in the state of being alloyed with other metals. In particular, since chrome (Cr) is not easily corroded or discolored, chrome exhibits high resistance to the conductive liquid in the cavity.

The first electrode 45 may be disposed on one surface of the first plate 41. The first electrode 45 may be disposed on the inclined surface of the cavity and on the upper surface of the first plate 41. The second electrode 46 may be disposed on one surface of the second plate 42. The second electrode 46 may be disposed on at least a portion of the inner surface of the cavity and on the lower surface of the second plate 42.

The insulation layer 47 is configured to electrically insulate the first electrode 45 from the conductive liquid 43 and the non-conductive liquid 44. For example, the insulation layer 47 may include parylene C, and may be formed through a method such as coating, deposition, or plating.

The insulation layer 47 may be disposed on an inclined surface that is in contact with the conductive liquid 43 and the non-conductive liquid 44. In addition, the insulation layer 47 may also be disposed on the first plate 41 and/or under the non-conductive liquid 44. However, the insulation layer 47 may not be disposed in the space between the first plate 41 and the second plate 42, into which the first substrate 48 is inserted. Further, the first substrate 48 and the insulation layer 47 may not overlap each other.

The first substrate 48 may include a driving voltage supply unit (not shown), which receives a driving voltage from a voltage driver (not shown) of the control circuit 24 (refer to FIG. 1) and applies the driving voltage to the liquid lens 300A. The driving voltage includes analog voltages corresponding to four individual electrodes and an analog voltage corresponding to one common electrode. The driving voltage supply unit may include a voltage-adjusting circuit or a noise-removing circuit to compensate for loss due to terminal connection between the control circuit 24 and the lens assembly 22, or the driving voltage may bypass the driving voltage supply unit. The first substrate 48 may be a flexible printed circuit board (FPCB). However, the scope of the embodiment is not limited thereto.

The first substrate 48 may be inserted between the first plate 41 and the second plate 42 so as to overlap the first plate 41 and the second plate 42, and may be electrically connected to one common electrode C0 included in the second electrode 46 and to four individual electrodes L1, L2, L3 and L4 included in the first electrode 45 in order to supply a driving voltage thereto.

The first substrate 48 may further include a stiffener. The stiffener may be disposed on at least a part of the portion of the first substrate that is coupled to at least one of the first plate 41 or the second plate 42, or may be disposed on at least a part of the portion of the first substrate that does not overlap at least one of the first electrode 45 or the second electrode 46. Further, in order to prevent bonding failure or damage to the first plate 41 or the second plate 42, a corresponding region of the first plate 41 or the second plate 42 may be filled with a reinforcing material in advance, or a region of the first substrate 48 that is to be bent may be made thin.

FIGS. 5 to 10 are views showing an example of a method of manufacturing a liquid lens according to an embodiment.

Figure 5:
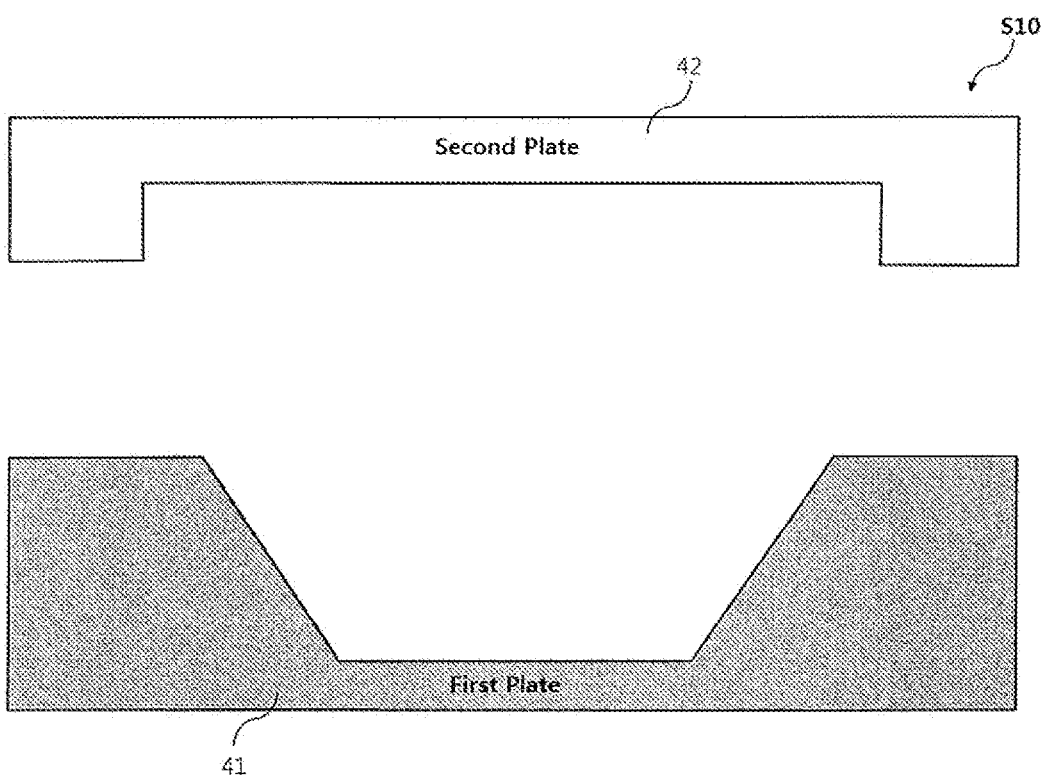
FIGS. 5 to 10 are views showing an example of a method of manufacturing the liquid lens according to the first embodiment.

Referring to FIG. 5, in step S10, the first plate 41 and the second plate 42 may be processed so as to have a shape for providing a predetermined cavity. Each of the first plate 41 and the second plate 42 may be formed of a glass material having high optical transmittance. However, the scope of the embodiment is not limited thereto. In the case of using a glass material, the occurrence of reflection or refraction of light may be prevented. The overall thickness of the first plate 41 may be greater than the overall thickness of the second plate 42. The overall thickness of the first plate 41 may be in the range of 1.5 to 3 times the overall thickness of the second plate 42. For example, the total thickness of the first plate 41 and the second plate 42 may be about 1 mm or less, the thickness of the first plate 41 may be about 0.7 mm or less, and the thickness of the second plate 42 may be about 0.3 mm or less.

Figure 6:
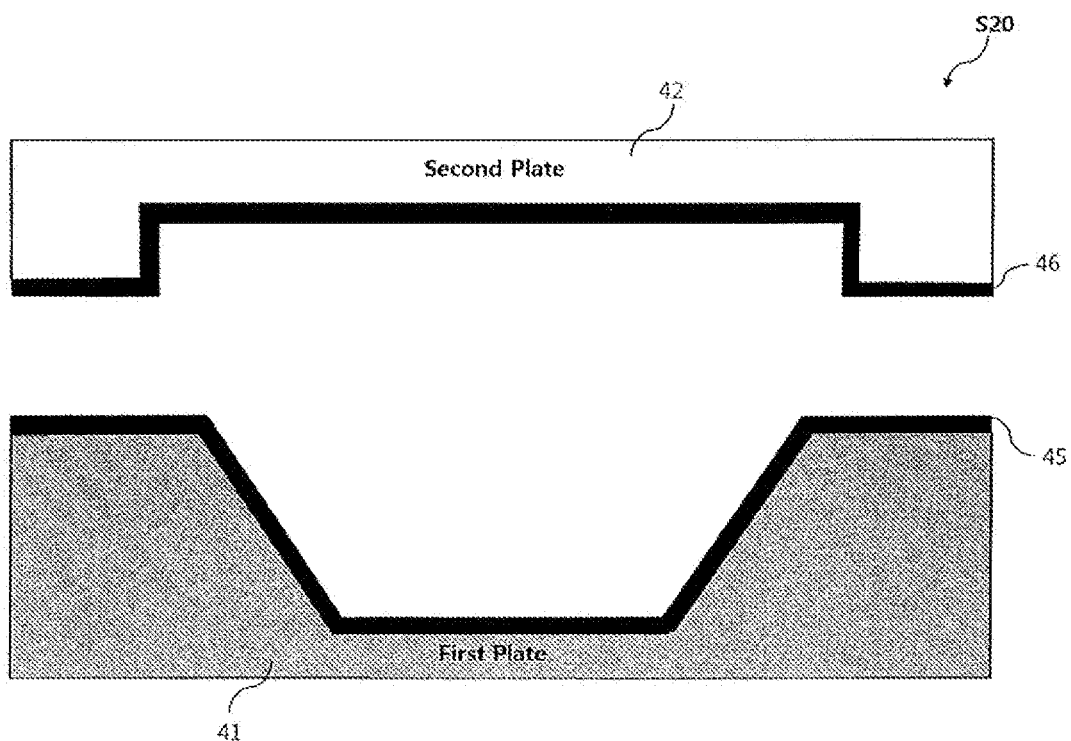

Referring to FIG. 6, in step S20, a deposition, plating, or coating process may be performed on one surface of each of the first plate 41 and the second plate 42 in order to dispose the first electrode 45 and the second electrode 46 thereon. Since a deposition, plating, or coating process for formation of electrodes is performed on only one surface of each of the first plate 41 and the second plate 42, a process for forming electrodes on the opposite surfaces of each of the plates is not required.

If electrodes need to be formed on the opposite surfaces of a glass layer, a deposition, plating, or coating process for forming an electrode is first performed on one surface of the glass layer, and subsequently a deposition, plating, or coating process for forming an electrode is performed on the other surface of the glass layer. At this time, when an electrode is formed on the other surface of the glass layer, the one surface of the glass layer is likely to be scratched by equipment. Further, the electrodes formed on the opposite surfaces of the glass layer need to be electrically connected to each other. However, the connection process is difficult to perform, and may scratch the electrodes. Such scratching may be a cause of interrupting the normal supply of driving voltage and thus deteriorating the driving performance of the liquid lens.

However, according to the liquid lens 300A of the embodiment, a deposition, plating, or coating process for forming an electrode is performed on only one surface of each of the first plate 41 and the second plate 42, and thus it is not necessary to carry out a process for forming electrodes on the opposite surfaces of each of the plates, which may scratch the electrode.

Figure 7:
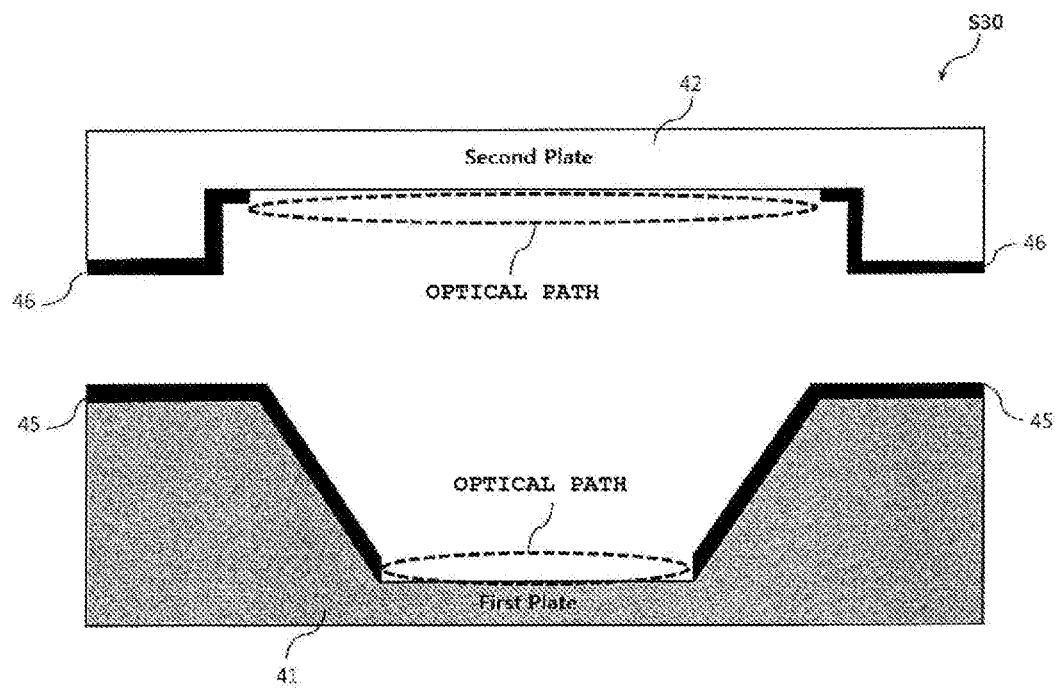

Referring to FIG. 7, in step S30, the first electrode 45 and the second electrode 46, which cause reflection or refraction of light, may be disposed so as not to be located in a region corresponding to an optical path, and a metal-patterning process may be performed so that a driving voltage supplied from the first substrate 48 is transmitted to the individual electrodes L1, L2, L3 and L4 and to the common electrode C0.

Figure 8:
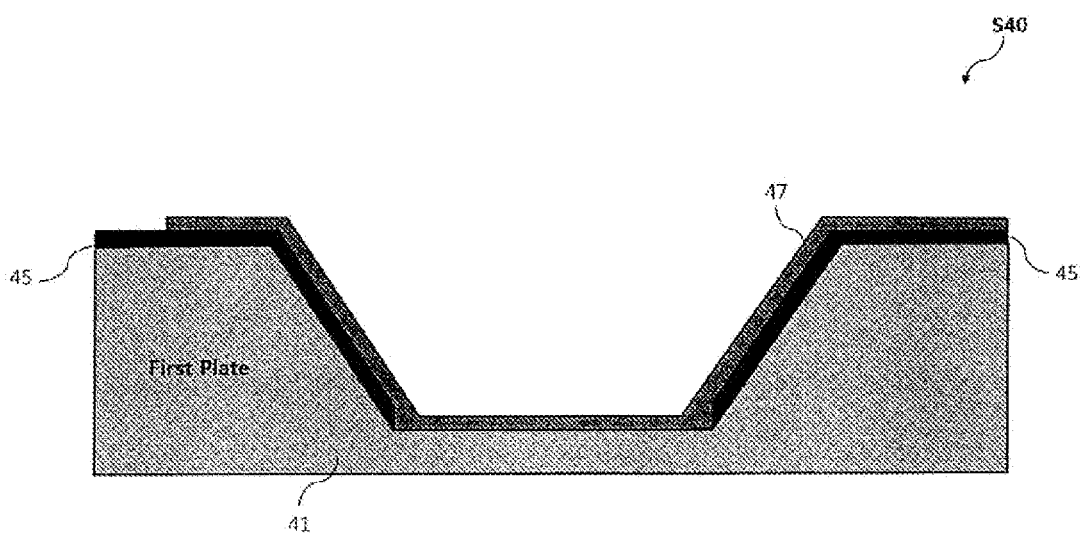

Referring to FIG. 8, in step S40, insulation coating may be performed to dispose the insulation layer 47. The insulation layer 47 may be disposed so as to contact the inclined surface on which the conductive liquid 43 and the non-conductive liquid 44 are disposed. In addition, the insulation layer 47 may be disposed on the first plate 41. In addition, the insulation layer 47 may be disposed under the non-conductive liquid 44. However, the space between the first plate 41 and the second plate 42, into which the first substrate 48 is inserted, may not be coated with the insulation layer 47.

Figure 9:
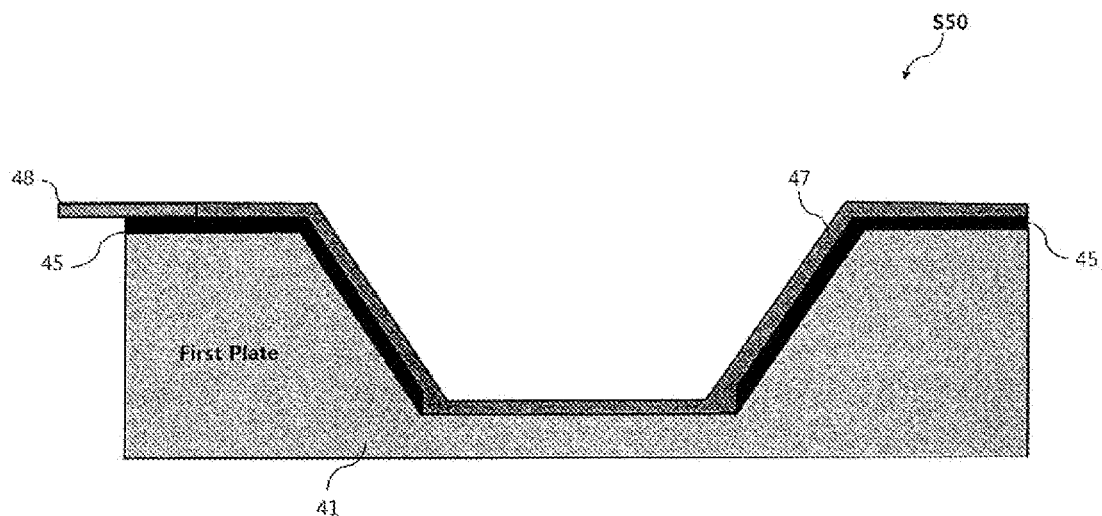

Referring to FIG. 9, in step S50, the first substrate 48 may be bonded and fixed to the first electrode 45 through a bonding process. The lower terminal of the first substrate 48 and the first electrode 45 may be electrically connected to each other through the bonding process.

The thickness of the first substrate 48 may range from about 25 μm to 200 μm, and the thickness of the insulation layer 47 may be set to be greater or less than the thickness of the first substrate 48 in consideration of the bonding process, or may be set to be equal thereto. The thickness of the insulation layer 47 may range from about 0.5 μm to 250 μm. The second electrode 46 may be disposed so as to be spaced apart from the insulation layer 47.

Figure 10:
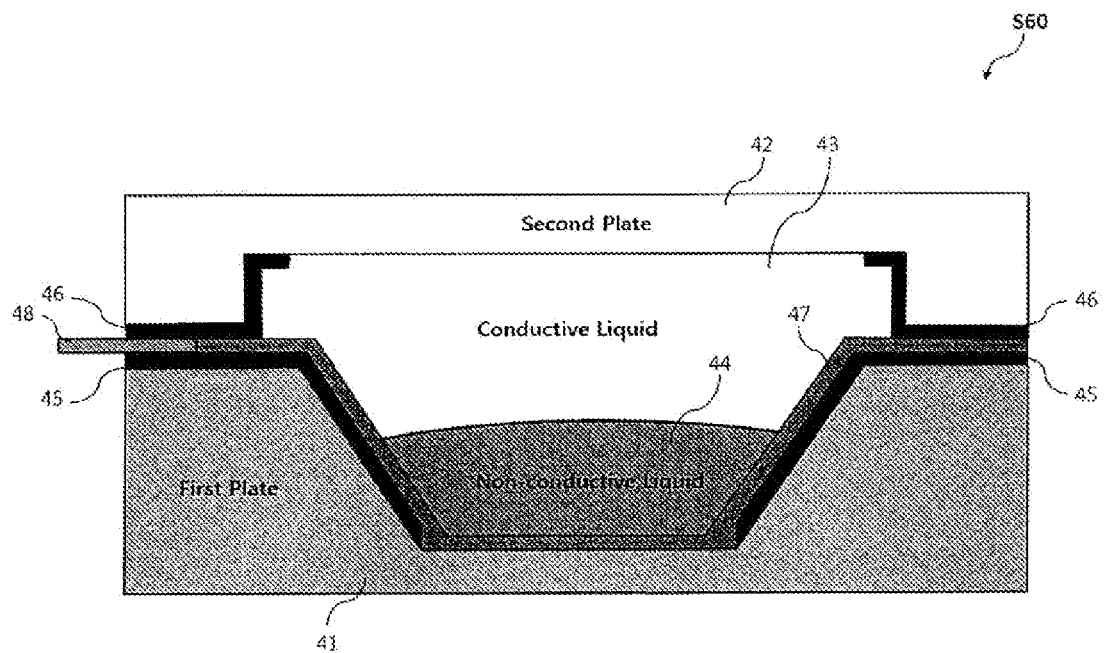

Meanwhile, after step S60 in FIG. 10 is completed, the first substrate 48 may be bent so as to be connected to the control circuit 24 and to be coupled to the cover housing.

Referring to FIG. 10, in step S60, after a predetermined volume of non-conductive liquid 44 is injected into the open region in the first plate 41, to which the first substrate 48 has been bonded, a process of bonding the second electrode 46, the insulation layer 47 and the first substrate 48 to each other and a process of injecting the conductive liquid 43 into the cavity so as to completely fill the cavity may be performed simultaneously or sequentially.

The upper terminal of the first substrate 48 may be bonded to the second electrode 46, and the lower terminal of the first substrate 48 may be bonded to the first electrode 45. Further, anisotropic conductive film (ACF) bonding may be performed between the first substrate 48 and the first plate 41 or the second plate 42, which is formed of a glass material.

Figure 11:
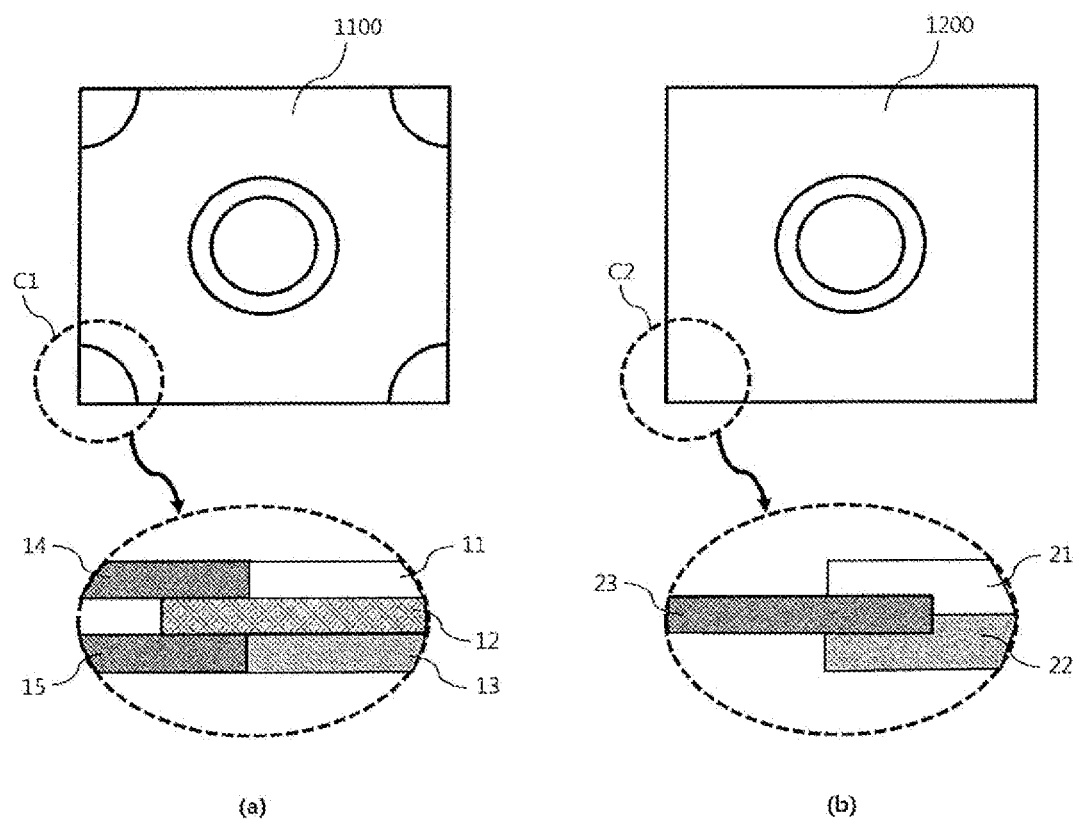
FIG. 11 is a view showing the comparison between the characteristics of the liquid lens according to the first embodiment and those of a comparative example.

FIG. 11 is a view showing the comparison between the characteristics of the liquid lens according to the embodiment and those of a comparative example.

FIG. 11(a) illustrates a view of a liquid lens 1100 according to a comparative example when viewed from above, and further illustrates the cross-section of any one C1 of the corners of the liquid lens.

An exposure portion may be disposed at each corner of a second plate (which corresponds to the second plate 42), which is disposed at the upper side of the liquid lens 1100, in order to expose an electrode to be connected to a second substrate (which corresponds to the first substrate 48). In order to form the exposure portion, a glass-etching process for etching the second plate, which is formed of a glass material, is required. However, there is a high probability of the second plate being unintentionally damaged during the etching process.

Referring to the cross-section of any one C1 of the corners of the liquid lens, a first plate 13, a second plate 11, and a third layer 12, which are formed of a glass material, are sequentially stacked, and electrode layers for supplying a voltage to individual electrodes and a common electrode are metal-patterned on the opposite surfaces of the second plate 11. Thus, as described above, exposure portions for exposing electrodes need to be formed on a portion of the first plate 13 and a portion of the second plate 11 (a glass-etching process is required), and two FPCBs, namely a second substrate 14 connected to the upper side of the third layer 12 and a third substrate 15 connected to the lower side of the third layer 12, are required.

FIG. 11(b) illustrates a view of a liquid lens 1200 according to the embodiment when viewed from above, and further illustrates the cross-section of any one C2 of the corners of the liquid lens. Here, the liquid lens 1200 corresponds to the liquid lens 300A in FIG. 4.

Unlike the liquid lens 1100 shown in FIG. 11(a), it is not necessary to form an exposure portion for exposing electrodes to be connected to the first substrate 48 on each corner of the second plate 42, which is disposed at the upper side of the liquid lens 1200, and thus a glass-etching process is not required.

Referring to the cross-section of any one C2 of the corners of the liquid lens, a first plate 22 and a second plate 21, which are formed of a glass material, are sequentially stacked, and electrode layers for supplying a voltage to individual electrodes and a common electrode are metal-patterned on the upper side of the first plate 22 and on the lower side of the second plate 21. The liquid lens 1200 is configured such that a first substrate 23 is inserted between the first plate 22 and the second plate 21. Thus, a glass-etching process for forming an exposure portion is not necessary, and only one first substrate 23 needs to be inserted.

According to the liquid lens of one embodiment, it is possible to reduce the amount of glass and the number of FPCBs and to omit processes that may incur loss of a large amount of materials and are difficult to perform, such as a glass-etching process, a double-sided metal deposition process, a plating or coating process, a glass-bonding process, and an ACF bonding process, thereby improving production yield of the liquid lens and reducing manufacturing costs.

The liquid lens according to an embodiment may include at least one of a first plate 41, which includes a cavity formed therein to accommodate a conductive liquid 43 and a non-conductive liquid 44 therein, a first electrode 45 disposed on the first plate 41, an insulation layer 47 disposed on the first electrode 45, a second electrode 46 disposed on the insulation layer 47, a second plate 42 disposed on the second electrode 46 and coupled to the first plate 41, or a first substrate 41 disposed between the first plate 41 and the second plate 42 and electrically connected to the first electrode 45 and the second electrode 46.

Further, the first electrode 45 may be connected to the lower side of the first substrate 48, and the second electrode 46 may be connected to the upper side of the first substrate 48. Here, the side wall of the cavity may include a predetermined inclined surface.

Here, the first electrode 45 may include a plurality of electrode sectors disposed on the inclined surface, and the second electrode 46 may include at least one electrode sector, at least a portion of which contacts the conductive liquid 43.

Here, the thickness of the first substrate 48 may be less than the thickness of the insulation layer 47.

Here, the thickness of the first substrate 48 may range from 25 μm to 200 μm.

Here, the insulation layer 47 may be disposed so as not to overlap the first substrate 48.

Here, the first electrode 45 and the second electrode 46 may not be disposed in an optical path along which light passes through the liquids 43 and 44 in the liquid lens 300A.

Here, the first electrode 45 may be disposed on the first plate 41 through any one method of metal deposition, plating, and coating, and the second electrode 46 may be disposed under the second plate 42 through any one method of metal deposition, plating, and coating.

Here, the first electrode 45 and the second electrode 46 may be adhered to the first substrate 48 through a bonding process.

A liquid lens 300A according to another embodiment may include at least one of a first plate 41 including an open region having a predetermined inclined surface, a second plate 42 disposed on the first plate 41, a conductive liquid 43 and a non-conductive liquid 44 charged in a cavity, which is defined by the first plate 41, the second plate 42 and the open region, or a first electrode 45 and a second electrode 46 disposed between the first plate 41 and the second plate 42.

Here, the liquid lens may further include a first substrate 48, which is inserted between the first plate 41 and the second plate 42 so as to overlap the first plate 41 and the second plate 42.

A camera module according to one embodiment may include at least one of a housing including an open upper side and an open lower side, a liquid lens 300 or 300A accommodated in the housing, a first lens unit 100 disposed on the liquid lens 300 or 300A, a second lens unit 200 disposed under the liquid lens 300 or 300A, a sensor substrate disposed under the second lens unit 200 and including an image sensor 26 mounted thereon, or a first substrate 48 electrically connecting the liquid lens 300 or 300A to the sensor substrate. Further, the first substrate 48 may be disposed between a first plate 41 and a second plate 42 of the liquid lens 300 or 300A, and may be electrically connected to a first electrode 45 and a second electrode 46 of the liquid lens 300 or 300A.

Second Embodiment

Hereinafter, a second embodiment will be described with reference to the accompanying drawings. The description of the first embodiment made above with reference to FIGS. 1, 2 and 3 may also be applied to the second embodiment. Further, unless otherwise stated, the characteristics of the first embodiment may be integrated into the second embodiment, and the characteristics of the second embodiment may be integrated into the first embodiment.

Figures 12, 13:
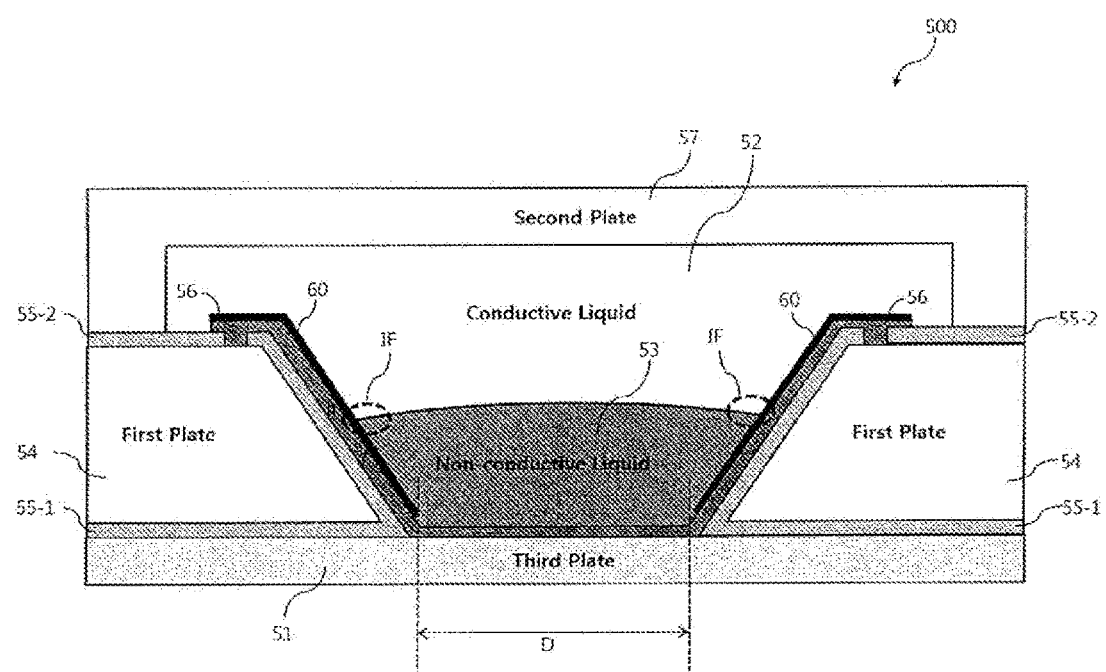
FIG. 12 is a view showing a phenomenon that may occur in a lens assembly including a liquid lens.
FIG. 13 is a view showing a liquid lens according to a 2-1st embodiment.

FIG. 12 is a view showing a phenomenon that may occur in a lens assembly including a liquid lens.

FIG. 12 schematically illustrates a beam path and an abnormal quantity of light in accordance with an angle at which light is incident on the lens assembly 22 including the liquid lens.

Light incident at an angle at which a ghost phenomenon or a flare phenomenon may occur is shown by way of example in the beam path.

A ghost phenomenon is a phenomenon in which, when strong light is directly incident on a lens and is reflected from a lens barrel, an afterimage remains and is superimposed on a photographed image. The afterimage is formed in accordance with the circumferential shape of an aperture.

A flare phenomenon is a phenomenon in which a photographed image looks blurry due to reflection of light incident on a lens from a lens barrel or diffuse reflection caused by a very bright subject.

Both the ghost phenomenon and the flare phenomenon are mainly caused by the reflection of light from a lens barrel, which may greatly deteriorate the quality of an image photographed through the lens assembly 22.

An abnormal quantity of light is a ratio of the quantity of light that causes a ghost phenomenon or a flare phenomenon to the total quantity of light incident on the lens assembly 22. In general, as the incidence angle of light increases, the abnormal quantity of light increases. Of course, a user may mitigate the ghost phenomenon or the flare phenomenon by appropriately adjusting the photographing angle. However, the presence of a ghost phenomenon or a flare phenomenon that is intensified at a certain angle may seriously deteriorate the quality of the camera module 10.

FIG. 13 is a view showing a liquid lens 500 according to still another embodiment (i.e. a 2-1st embodiment).

FIG. 13 illustrates the cross-section of the liquid lens 500, which corresponds to an example of the cross-section of the liquid lens 28 shown in FIG. 3.

The liquid lens 500 may include a conductive liquid 52, a non-conductive liquid 53, a plate, an electrode unit, an insulation layer 56, and a reflection-preventing layer 60. The plate may include a first plate 54, and may further include a second plate 57 and a third plate 51. The electrode unit may include a first electrode 55-1 and a second electrode 55-2, and the reflection-preventing layer 60 may be a black insulation layer. Further, the reflection-preventing layer 60 may be a reflection-reducing layer that lowers reflectance. Alternatively, the reflection-preventing layer 60 may lower the reflectance with respect to light having a predetermined range of wavelength to less than a predetermined reflectance. For example, the reflection-preventing layer 60 may lower the reflectance with respect to light having a wavelength of 380 nm to 800 nm, which corresponds to visible light, to less than 5% or less than 10%.

The third plate 51 may be formed of a transparent material, and may be the first part of the liquid lens 500 that receives the light that has passed through the first lens unit 100 (refer to FIG. 2). Although the present disclosure is described on the assumption that the liquid lens 500 is the liquid lens 28 included in the lens assembly 22 in FIG. 2, the liquid lens 500 may be mounted in the lens assembly such that the third plate 51 is the last part of the liquid lens 500 that receives light. The third plate 51 may be disposed under the first electrode 55-1, and the second plate 57 may be disposed on the second electrode 55-2.

The conductive liquid 52 and the non-conductive liquid 53 may be charged in a cavity defined by an open region of the first plate 54. That is, the cavity may be filled with the conductive liquid 52 and the non-conductive liquid 53 that have different properties from each other, and an interface may be formed between the conductive liquid 52 and the non-conductive liquid 53 that have different properties from each other.

As the interface formed between the conductive liquid 52 and the non-conductive liquid 53 changes in flexure and inclination, the focal length or the shape of the liquid lens 500 may be adjusted. The region in which an optical signal may pass through the interface may correspond to the lens region 310 described with reference to FIG. 3.

Here, the conductive liquid 52 may include at least one of ethylene glycol or sodium bromide (NaBr), or may be formed of a mixture of ethylene glycol and sodium bromide (NaBr). The non-conductive liquid 53 may include a phenyl-based silicon oil.

The first plate 54 may be disposed between the third plate 51 and the second plate 57, and may include an open region having a predetermined inclined surface (e.g. an inclined surface having an angle of about 59° to 61°). That is, the first plate 54 may include an inclined surface therein, and the conductive liquid 52 and the non-conductive liquid 53 may be disposed on the inclined surface. The first plate 54 is a housing structure in the liquid lens 500, in which two kinds of liquid having different properties from each other are accommodated. The third plate 51 and the second plate 57 may include a region through which an optical signal passes, and thus may be formed of a material having high transparency, such as glass. The first plate 54 may also be formed of a material such as glass (it is easy to prevent the liquid charged in the cavity from flowing out when an intermediate layer formed of the same material is used for bonding) for convenience of processing. According to another embodiment, the first plate 54 may include impurities so that an optical signal does not easily pass therethrough.

The first electrode 55-1 and the second electrode 55-2 may function to apply an electrical signal received from the control circuit 24 (refer to FIG. 1) for controlling the interface formed between the conductive liquid 52 and the non-conductive liquid 53. The first electrode 55-1 may be disposed on the inclined surface of the first plate 54, and the second electrode 55-2 may be disposed on the upper side of the first plate 54.

As described with reference to FIG. 3, electrodes and/or electrode patterns for forming the individual electrodes L1, L2, L3 and L4 and the common electrode C0 may be included in both sides of the first plate 54, which are adjacent to the third plate 51 and the second plate 57. The second electrode 55-2 may be a common electrode, which is disposed so as to be in contact with the conductive liquid 52, and the first electrode 55-1 may be an individual electrode, which is disposed adjacent to the conductive liquid 52, with the insulation layer 56 interposed therebetween.

Here, the first electrode 55-1 and the second electrode 55-2 may include chrome (Cr). Chromium or chrome is a glossy silver rigid transition metal, which is not fragile, does not readily discolor, and has a high melting point. However, since an alloy including chromium exhibits high corrosion resistance and rigidity, chromium may be used in the state of being alloyed with other metals. In particular, since chrome (Cr) is not easily corroded or discolored, chrome exhibits high resistance to the conductive liquid in the cavity.

The insulation layer 56 is configured to physically insulate the first electrode 55-1 from the conductive liquid 52 and the non-conductive liquid 53. For example, the insulation layer 56 may include parylene C, and may be formed through a method such as coating, deposition, or plating.

The insulation layer 56 may be disposed on the inclined surface so as to be in contact with the conductive liquid 52 and the non-conductive liquid 53, and may extend to the upper side of the first plate 54 and to the lower side of the non-conductive liquid 53. The insulation layer 56 may be disposed on the first electrode 55-1. The insulation layer 56 may be disposed above the first plate 54, on which the first electrode 55-1 and the second electrode 55-2 are disposed adjacent to each other, so as to cover the first electrode 55-1 in order to prevent the first electrode 55-1 from contacting the conductive liquid 52. As shown in FIG. 13, the insulation layer 56 may be disposed such that at least a portion thereof is in contact with the second electrode 55-2. However, the scope of the embodiment is not limited thereto.

The second plate 57 may be formed of a transparent material such as glass, and may form a cavity together with the third plate 51 and the open region so that the cavity is filled with the conductive liquid 52 and the non-conductive liquid 53.

The reflection-preventing layer 60 may be disposed on a position, at which the interface is formed between the conductive liquid 52 and the non-conductive liquid 53 along the inclined surface in the open region, and on the first electrode 55-1 and the insulation layer 56. Further, the reflection-preventing layer 60 may be disposed so as to be in contact with an edge interface IF, which is adjacent to the insulation layer 56. That is, the reflection-preventing layer 60 may be disposed so as to be in contact with the edge interface IF on the outermost portion of the inclined surface in the open region. Thereby, the interface formed between the conductive liquid 52 and the non-conductive liquid 53 may move along the insulation layer 56-1 disposed on the inclined surface.

Further, the reflection-preventing layer 60 may be disposed so as not to overlap an open surface D, which is formed under the non-conductive liquid 53 to allow light to pass therethrough. The reason for this is to prevent a field-of-view (FOV) of the liquid lens 500 from being affected by the reflection-preventing layer 60.

The reflection-preventing layer 60 may be formed of a material that does not reflect light (e.g. a material coated with graphite or a soma film) or a material that has a lower light reflectance than the insulation layer 56. The reflection-preventing layer 60 may be disposed through a process of coating, plating, or depositing a graphite material on the insulation layer 56, or may be disposed through a process of bonding a soma film to the insulation layer 56. According to another embodiment, the reflection-preventing layer 60 may include a black resin.

For example, the thickness of the insulation layer 56 may range from about 0.5 μm to 15 μm or from about 1 μm to 10 μm. The thickness of the reflection-preventing layer 60 may range from about 0.5 μm to 10 μm or from about 1 μm to 5 μm.

Since the ghost phenomenon and the flare phenomenon are most likely to occur due to the reflection occurring at the edge interface IF and the inclined surface in the open region, the reflection-preventing layer 60 for preventing reflection of light or reducing the light reflectance may be disposed on the above regions, thereby preventing the ghost phenomenon and the flare phenomenon.

Further, the reflection-preventing layer 60 may be disposed so as to extend to the upper side of the first plate 54, and may prevent light, which has been reflected from or has passed through the third plate 51, the first plate 54, the electrode layer 55, or the insulation layer 56, from being transmitted to the second plate 57, thereby preventing deterioration in the quality of an image due to the light passing through the liquid lens 500. Alternatively, unlike the embodiment, the reflection-preventing layer 60 may prevent deterioration in the quality of an image due to light progressing from the second plate 57 to the third plate 51.

The reflection-preventing layer 60, which extends to the upper side of the first plate 54, is not necessarily disposed so as to be in contact with the conductive liquid 52 or the second plate 57, so long as it is capable of exhibiting the above effects. Further, the reflection-preventing layer 60 may be disposed between two adjacent layers among the first plate 54, the electrode layer 55, and the insulation layer 56.

Figure 14:
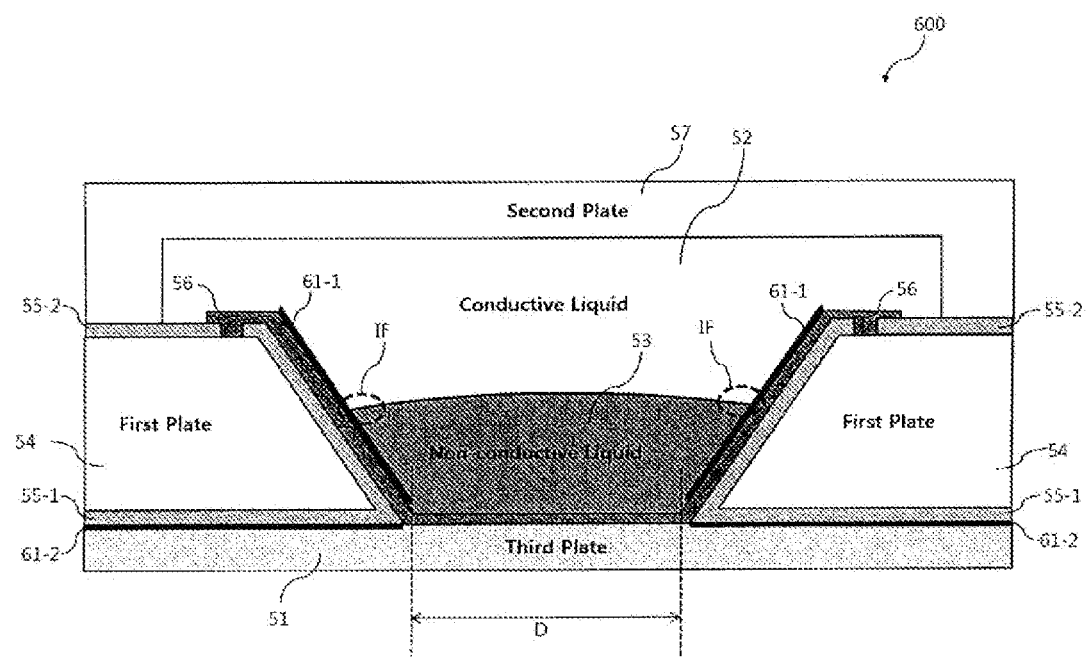
FIG. 14 is a view showing a liquid lens according to a 2-2nd embodiment.

FIG. 14 is a view showing a liquid lens 600 according to still another embodiment (i.e. a 2-2nd embodiment).

FIG. 14 illustrates the cross-section of the liquid lens 600, which corresponds to another example of the cross-section of the liquid lens 28 shown in FIG. 3.

Like the reflection-preventing layer 60 included in the liquid lens 500 shown in FIG. 13, a reflection-preventing layer 61-1 included in the liquid lens 600 may be disposed on a position, at which the interface is formed between the conductive liquid 52 and the non-conductive liquid 53 along the inclined surface in the open region, and on the first electrode 55-1 and the insulation layer 56. Further, the reflection-preventing layer 61-1 may be disposed so as to be in contact with an edge interface IF, which is adjacent to the insulation layer 56. That is, the reflection-preventing layer 61-1 may be disposed so as to be in contact with the edge interface IF on the outermost portion of the inclined surface in the open region. Thereby, the interface formed between the conductive liquid 52 and the non-conductive liquid 53 may move along the insulation layer 56 disposed on the inclined surface. Further, the reflection-preventing layer 61-1 may be disposed so as not to overlap an open surface D, which is formed under the non-conductive liquid 53. The reason for this is to prevent a field-of-view (FOV) of the liquid lens 500 from being affected by the reflection-preventing layer 61-1.

The reflection-preventing layers 61-1 and 61-2 may be formed of a material that does not reflect light (e.g. a material coated with graphite or a soma film) or a material that has a lower light reflectance than the insulation layer 56. The reflection-preventing layer 60 may be disposed through a process of coating, plating, or depositing a graphite material on the insulation layer 56, or may be disposed through a process of bonding a soma film to the insulation layer 56. According to another embodiment, the reflection-preventing layers 61-1 and 61-2 may include a black resin.

For example, the thickness of the insulation layer 56 may range from about 0.5 μm to 15 μm or from about 1 μm to 10 μm. The thickness of each of the reflection-preventing layers 61-1 and 61-2 may range from about 0.5 μm to 10 μm or from about 1 μm to 5 μm.

Since the ghost phenomenon and the flare phenomenon are most likely to occur due to the reflection occurring at the edge interface IF and the inclined surface in the open region, the reflection-preventing layer 61-1 for preventing reflection of light or reducing the light reflectance may be disposed on the above regions, thereby preventing the ghost phenomenon and the flare phenomenon.

Further, the reflection-preventing layer 61-2 may be disposed under the first plate 54 so as not to overlap the open surface D, and may prevent light, which has been reflected from or has passed through the third plate 51, from being transmitted to the first plate 54, the electrode layer 55, the insulation layer 56, or the second plate 57, thereby preventing deterioration in the quality of an image due to the light passing through the liquid lens 500. Alternatively, unlike the embodiment, the reflection-preventing layer 61-2 may prevent deterioration in the quality of an image due to light progressing from the second plate 57 to the third plate 51.

The reflection-preventing layer 61-2, which extends to the lower side of the first plate 54, is not necessarily disposed so as to be in contact with the third plate 51, so long as it is capable of exhibiting the above effects. Further, the reflection-preventing layer may also be disposed between the first electrode 55-1 and the first plate 54.

Figure 15:
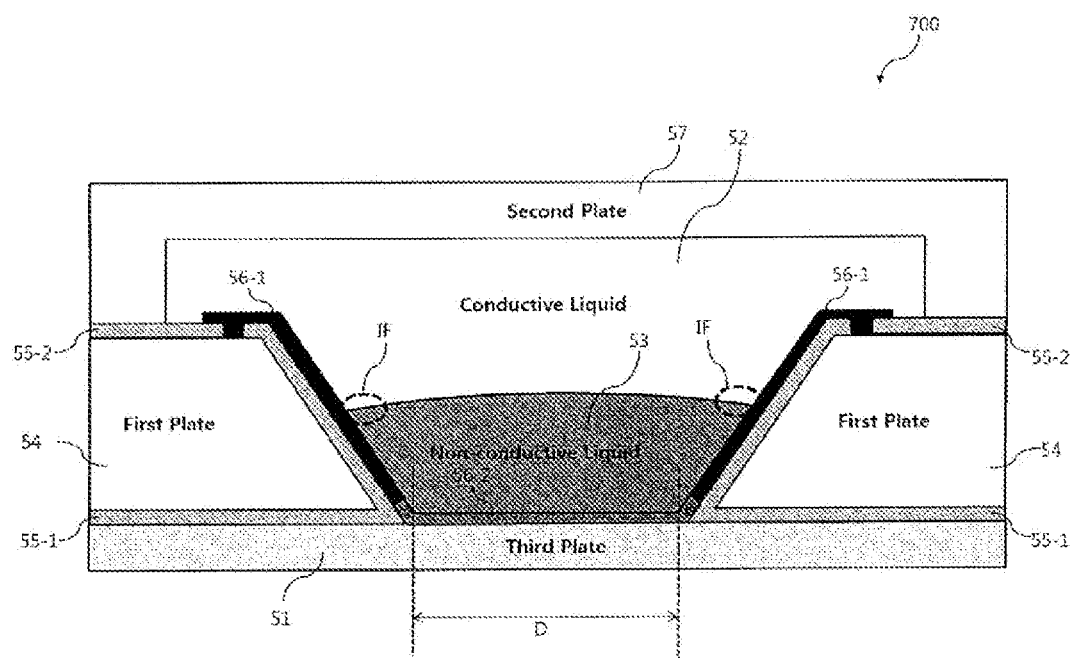
FIG. 15 is a view showing a liquid lens according to a 2-3rd embodiment.

FIG. 15 is a view showing a liquid lens 700 according to still another embodiment (i.e. a 2-3rd embodiment).

FIG. 15 illustrates the cross-section of the liquid lens 700, which corresponds to still another example of the cross-section of the liquid lens 28 shown in FIG. 3.

Unlike the liquid lens 500 or 600 shown in FIG. 13 or 14, the liquid lens 700 may not include a separate reflection-preventing layer. In other words, the liquid lens 700 may be configured such that an insulation layer 56-1 thereof has a reflection-preventing function or a reflection-reducing function. The insulation layer 56-1 may be defined as a black insulation layer.

The insulation layer 56-1 may be disposed on the first electrode 55-1 along the inclined surface of the first plate 54. Further, the insulation layer 56-1 may extend along the lower side or the upper side of the first plate 54.

That is, the insulation layer 56-1 may be formed of a parylene C coating. However, the insulation layer 56-1 may include a black resin for reducing light transmittance. The black resin may be formed of a material having excellent light absorption and low chemical reactivity with parylene C. Further, the black resin may be a reflection-preventing resin or a reflection-reducing resin. According to another embodiment, the insulation layer 56-1 may be formed of a material coated with graphite, a soma film, or a material that has a lower light reflectance than the insulation layer. The insulation layer 56-1 may be disposed through a process of coating, plating, or depositing a graphite material on the first electrode 55-1, or may be disposed through a process of bonding a soma film to the first electrode 55-1.

The insulation layer 56-1, which includes a black resin, may be disposed on a position, at which the interface is formed between the conductive liquid 52 and the non-conductive liquid 53. Further, the insulation layer 56-1 may be disposed so as to be in contact with an edge interface IF. That is, the insulation layer 56-1 may be disposed so as to be in contact with the edge interface IF on the outermost portion of the inclined surface in the open region. Thereby, the interface formed between the conductive liquid 52 and the non-conductive liquid 53 may move along the insulation layer 56-1 disposed on the inclined surface. Further, the insulation layer 56-1 may be disposed so as not to overlap an open surface D, which is formed under the non-conductive liquid 53. The reason for this is to prevent an FOV of the liquid lens 700 from being affected by the insulation layer 56-1.

Further, an insulation layer 56-2, which does not include a black resin, may be additionally disposed between the non-conductive liquid 53 and the third plate 51 within the region through which light passes. In this case, the insulation layer 56-2 may be a transparent insulation layer that has high light transmittance. Furthermore, the thicknesses of the insulation layers 56-1 and 56-2 may be the same as each other. Alternatively, in order to adjust the control range of the interface, the thickness of the insulation layer 56-1 may be set to be greater or less than the thickness of the insulation layer 56-2 in accordance with the material of the insulation layer 56-1.

For example, the thickness of the insulation layer 56-1, which includes a black resin, may range from about 0.5 μm to 20 μm or from about 1 μm to 15 μm. The thickness of the insulation layer 56-2, which does not include a black resin, may range from about 0.5 μm to 15 μm or from about 1 μm to 10 μm.

Since the ghost phenomenon and the flare phenomenon are most likely to occur due to the reflection occurring at the edge interface IF and the inclined surface in the open region, the insulation layer 56-1 including a black resin to prevent reflection of light may be disposed on the above regions, thereby preventing the ghost phenomenon and the flare phenomenon. Accordingly, it is possible to reduce the ghost phenomenon and the flare phenomenon without modifying the original structure of the liquid lens.

Further, the insulation layer 56-1 may be disposed so as to extend to the upper side of the first plate 54, and may prevent light, which has been reflected from and/or has passed through the third plate 51, the first plate 54, the electrode layer 55, or the insulation layer 56, from being transmitted to the second plate 57, thereby preventing deterioration in the quality of an image due to the light passing through the liquid lens 700. Alternatively, unlike the embodiment, the reflection-preventing layer may prevent deterioration in the quality of an image due to light progressing from the second plate to the third plate. The reflection-preventing layer may be a reflection-suppressing layer that suppresses reflection of light. That is, the reflection-preventing layer may be a reflection-suppressing layer, which is disposed to provide a lower light reflectance than before the reflection-preventing layer is disposed.

The area in which the transparent insulation layer and the non-conductive liquid are in contact with each other may be greater than or equal to the area in which the third plate and the transparent insulation layer are in contact with each other.

The material of the black resin mentioned with reference to FIGS. 13 to 15 may be carbon nanotube (CNT) and/or polyamide. The black resin may be included in the liquid lens through a sputtering process, an E-beam process, and/or a chemical vapor deposition (CVD) process.

Hereinafter, the configuration of a camera module according to an embodiment will be described.

The camera module may include a lens assembly including a liquid lens, an infrared cutoff filter (not shown), a printed circuit board (not shown), an image sensor (not shown), and a controller (not shown). However, any one or more of the infrared cutoff filter and the controller may be omitted from or modified in the camera module.

The infrared filter may prevent infrared light from being incident on the image sensor. The infrared filter may be disposed between the lens assembly and the image sensor. The infrared filter may be an infrared absorption filter or an infrared reflection filter. Alternatively, the infrared filter may not be separately disposed, but may be coated or deposited on any one surface of the liquid lens.

The upper surface of the printed circuit board and the liquid lens may be electrically connected to each other. The image sensor may be disposed on the printed circuit board. The printed circuit board may be electrically connected to the image sensor. In one example, a holder member may be disposed between the printed circuit board and the lens assembly. Here, the holder member may accommodate the image sensor therein. The printed circuit board may supply power (current or voltage) to the liquid lens. Meanwhile, the controller for controlling the liquid lens may be disposed on the printed circuit board.

Hereinafter, the configuration of an optical device according to an embodiment will be described.

The optical device may be any one of a mobile phone, a smartphone, a portable smart device, a digital camera, a laptop computer, a digital broadcasting terminal, a personal digital assistant (PDA), a portable multimedia player (PMP), and a navigator. However, the optical device is not limited thereto, but may include any device capable of capturing an image or a picture.

The optical device may include a main body (not shown), a camera module, and a display unit (not shown). However, any one or more of the main body, the camera module, and the display unit may be omitted from or modified in the optical device.

Although only a limited number of embodiments have been described above, various other embodiments are possible. The technical contents of the above-described embodiments may be combined into various forms as long as they are not incompatible with one another, and thus may be implemented in new embodiments.

It will be apparent to those skilled in the art that various changes in form and details may be made without departing from the spirit and the essential characteristics of the disclosure set forth herein. Accordingly, the above detailed description is not intended to be construed to limit the disclosure in all aspects and to be considered by way of example. The scope of the disclosure should be determined by reasonable interpretation of the accompanying claims and all equivalent modifications made without departing from the disclosure should be included in the following claims.

MODE FOR INVENTION

Various embodiments have been described in the best mode for carrying out the disclosure.

INDUSTRIAL APPLICABILITY

A liquid lens, a camera module, and an optical device according to embodiments may be used in a mobile phone, a smartphone, a portable smart device, a digital camera, a laptop computer, a digital broadcasting terminal, a personal digital assistant (PDA), a portable multimedia player (PMP), a navigator, etc.

The invention claimed is:

1. A liquid lens, comprising:
a first plate comprising a cavity in which a conductive liquid and a non-conductive liquid are disposed, the cavity having an inclined surface;
a first electrode disposed on the inclined surface;
a second electrode disposed on the first plate;
a black insulation layer disposed between the first electrode and the conductive liquid;
an another plate disposed under the first plate; and
a transparent insulation layer disposed between the another plate and the non-conductive liquid,
wherein the conductive liquid and the non-conductive liquid form an interface therebetween, and the interface moves along one surface of the black insulation layer.

2. The liquid lens according to claim 1, wherein the transparent insulation layer has a thickness that is greater than or equal to a thickness of the black insulation layer.

3. The liquid lens according to claim 1, wherein the black insulation layer extends to an upper side of the first plate.

4. The liquid lens according to claim 1, wherein an area in which the transparent insulation layer and the non-conductive liquid are in contact with each other is greater than or equal to an area in which the another plate and the transparent insulation layer are in contact with each other.

5. The liquid lens according to claim 1, wherein the black insulation layer comprises graphite, a soma film, or a black resin.

6. The liquid lens according to claim 1, wherein the black insulation layer is disposed so as not to overlap an open surface, which is formed under the non-conductive liquid.

7. The liquid lens according to claim 1, wherein the black insulation layer is disposed so as to be in contact with the first electrode or the second electrode transmitting an electrical signal for controlling the interface.

8. The liquid lens according to claim 1, wherein the black insulation layer is disposed so as to extend along a lower side of the first plate.

9. A liquid lens, comprising:
a first plate comprising a cavity in which a conductive liquid and a non-conductive liquid are disposed, the cavity having an inclined surface;
a first electrode disposed on the inclined surface;
a second electrode disposed on the first plate;
a second plate disposed on the second electrode;
a third plate disposed under the first electrode; and
an insulation layer disposed on the third plate and the first electrode,
wherein the insulation layer comprises a first region and a second region having respectively different light transmittances.

10. The liquid lens according to claim 9, wherein the first region has higher light transmittance than the second region,
wherein the first region is a region disposed between the non-conductive liquid and the third plate, and
wherein the second region is a region disposed among the first electrode, the conductive liquid, and the non-conductive liquid.

11. A liquid lens, comprising:
a first plate comprising a cavity in which a conductive liquid and a non-conductive liquid are disposed, the cavity having an inclined surface;
a second plate disposed on the first plate;
a third plate disposed under the first plate;
a first electrode disposed on the inclined surface of the cavity;
a second electrode disposed between the first plate and the second plate; and
a reflection-suppressing layer disposed among the first electrode, the conductive liquid, and a non-conductive liquid.

12. The liquid lens according to claim 11, comprising:
an insulation layer disposed between the non-conductive liquid and the third plate,
wherein the insulation layer has a thickness of 0.5 μm to 15 μm, and the reflection-suppressing layer has a thickness of 0.5 μm to 10 μm.

13. A liquid lens, comprising:
a first plate comprising a cavity in which a conductive liquid and a non-conductive liquid are disposed, the cavity having an inclined surface;
a first electrode disposed on the inclined surface;
a second electrode disposed on the first plate;
a black insulation layer disposed between the first electrode and the conductive liquid; and
a reflection-preventing layer disposed on the black insulation layer, wherein the conductive liquid and the non-conductive liquid form an interface therebetween, and the interface moves along one surface of the black insulation layer.

14. The liquid lens according to claim 13, wherein the reflection-preventing layer is disposed on a position, at which the interface is formed, along the inclined surface.

15. The liquid lens according to claim 13, wherein the reflection-preventing layer is disposed on the first electrode and the black insulation layer.

16. The liquid lens according to claim 13, wherein the reflection-preventing layer is disposed so as to be in contact with an edge interface, which is adjacent to the black insulation layer.

17. The liquid lens according to claim 13, wherein the reflection-preventing layer is integrally formed with the black insulation layer.

18. The liquid lens according to claim 13, wherein the reflection-preventing layer lowers the reflectance with respect to light having a wavelength of 380 nm to 800 nm, which corresponds to visible light, to less than 5% or less than 10%.

19. The liquid lens according to claim 13, wherein the reflection-preventing layer is formed of a material that does not reflect light or a material that has a lower light reflectance than the black insulation layer.

* * * * *